July 9, 1935.    A. REDLER    2,007,874
CONVEYER
Filed Oct. 11, 1932
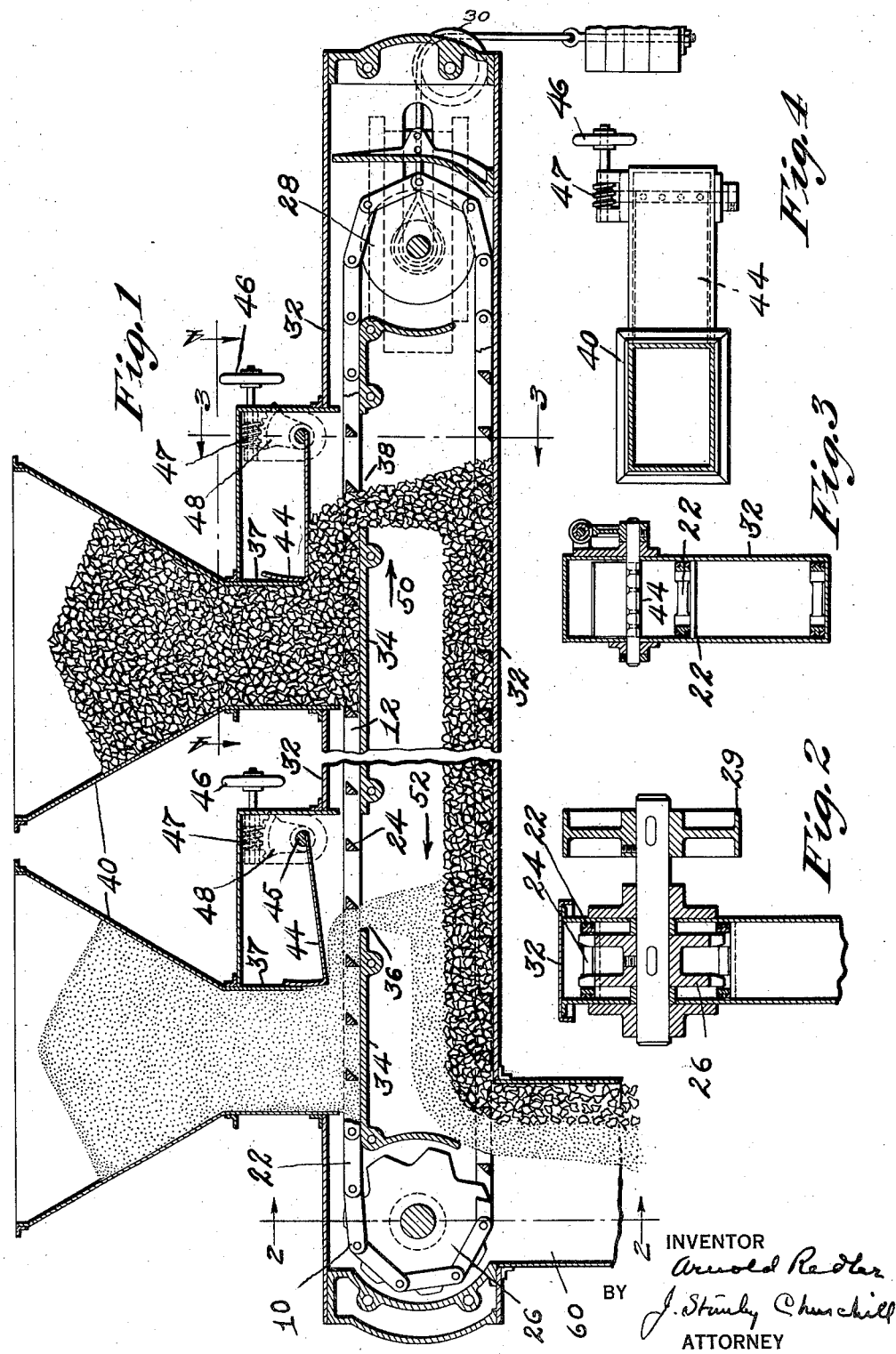
INVENTOR
Arnold Redler
BY
J. Stanley Churchill.
ATTORNEY Patented July 9, 1935

2,007,874

UNITED STATES PATENT OFFICE 2,007,874

CONVEYER

Arnold Redler, Sharpness Docks, England, assignor to Redler Conveyor Company, Quincy, Mass., a corporation of Massachusetts Application October 11, 1932, Serial No. 637,270

2 Claims. (Cl. 198—56)

This invention relates to a conveyer for flowable solid material and is in certain respects an improvement upon the conveyer illustrated in my Patent No. 1,744,676, Jan. 21, 1930.

One object of the invention is to provide a novel and improved construction of conveyer of the type specified, which is particularly adapted for use in withdrawing and measuring flowable solid material from a plurality of sources of bulk supply and discharging the same through a single discharge opening, and in this manner the invention finds particular utility in blending together predetermined volumes of different materials.

A further object of the invention is to provide conveying apparatus for flowable solid material adapted to withdraw a variable and measured volume of the material from a source of bulk supply in a novel, simple and highly efficient manner.

With these objects in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a longitudinal sectional view with parts broken away illustrating the present conveyer; and Figs. 2, 3 and 4 are sectional details taken on the lines 2—2, 3—3 and 4—4 respectively.

In general the present invention contemplates a conveyer of the type illustrated in my Patent No. 1,744,676 above referred to, in which a conveying element 10 having upper and lower runs 12, 14 is mounted for operation so that each run traverses within and cooperates with the walls of a conduit to be capable of transporting flowable solid material in a continuous stream. The conveyer 10 is preferably of open formation and capable of permitting the material being transported to fall through the openings therein to be discharged from the upper to the lower run, as will be described, and also to permit the material being conveyed by the lower run to be discharged through the lower run of conveyer and through a discharge opening in the conduit for the lower run. The upper run of the conveyer is arranged to cooperate with a plurality of sources of bulk supply of flowable solid material to withdraw material therefrom, and provision is made for regulating the volume of the material being withdrawn from each source of supply. The upper conduit is provided with openings arranged to permit the material being conveyed by the upper run of the conveyer to fall through the conveyer onto the lower run of the conveyer, and the discharge opening from the lower run of the conveyer is preferably disposed with relation to the aforesaid openings to permit the lower run of the conveyer to effect the conveyance of all of the material withdrawn from the sources of bulk supply and to discharge the same through the aforesaid discharge opening therein. As previously pointed out, in its complete form the present conveyer finds particular utility in the blending of predetermined amounts of different flowable solid materials.

Referring now to the drawing, the present conveyer is illustrated therein as provided with an endless chain 10 made up of pivotally connected links 22 and crossbars 24, as shown. The chain is arranged to run around sprockets 26, 28, the sprocket 26 being driven from a suitable source of power, such as a pulley 29, and the sprocket 28 being provided with the usual form of take-up indicated generally at 30. Both runs of the conveyer chain are enclosed within a casing 32, and the latter is provided with partition members 34 sub-dividing the interior of the casing in effect into two conduits, one for the upper run of the chain and the other for the lower run of the chain. The partition members are provided with openings 36, 38, through which the material being conveyed by the upper run of the conveyer may fall and be deposited upon the lower run of the conveyer. The upper run of the conveyer is arranged to withdraw material from a plurality of sources of bulk supply thereof, and as herein shown a plurality of hoppers 40 are mounted upon the top of the casing. The bottoms of the hoppers are arranged to terminate closely adjacent the upper run of the conveyer so that in effect the conveyer is arranged to run through the lower portion of the hoppers, the bottom walls of which are formed by the partition members 34, as illustrated. The front walls 37 of the hoppers are cut away to form discharge openings from the hoppers, and a regulator member 44 is arranged to control the withdrawal of the material from each hopper 40 by the upper run of the conveyer chain. The regulator members are preferably mounted upon shafts 45 arranged to be adjustably rotated from hand wheels 46 though worms 47 and segments 48, as illustrated.

In the operation of the conveyer, as the upper run of the chain moves in the direction of the arrow 50, a ribbon of material is moved with the chain of a height equal to the distance of the partition members 34 to the regulator 44, the operation of the conveyer following the principles of operation set forth in my Reissue Patent No. 18,445. As the material is conveyed in the upper conduit or over the partition members 34, it arrives over the openings 36, 38 therein and falls through the upper run 12 of the conveyer to be deposited upon the lower run 14 thereof. The lower run of the conveyer is provided with a discharge opening 60, located with respect to the openings 36, 38 in the partition members 34 so that as the lower run of the conveyer advances, the material deposited thereon is conveyed in the direction of the arrow 52, and all of the material is discharged through the common discharge opening 60.

While it is preferred to use a conveyer chain of the structure illustrated, nevertheless other open structures such as those set forth in my Reissue Patent No. 18,445 may be used with advantage and in the broader aspects of the invention other forms of conveyers may be used. As above stated, the illustrated conveyer finds particular utility in withdrawing different flowable solid materials from a plurality of sources of a bulk supply thereof, blending the same and discharging the blended material from the conveyer.

While the preferred embodiment of the invention has been herein illustrated and described, it will be understood that the invention may be embodied in other forms within the scope of the following claims.

Having thus described the invention, what is claimed is:—

1. In a conveyer, in combination, a conduit provided with a plurality of inlets and a single outlet, a conveying element having upper and lower runs, and a dividing plate within the conduit between the runs of the conveyer, said dividing plate having a portion below each said inlet extending in each direction beyond the angle of repose of the material in the inlet, the lower run of said conveyer constituting the carrying run, said lower run passing under each inlet, the upper run of the conveyer passing over said plate portions, said plate having openings between said portions to provide for separately feeding from each inlet to said lower run whereby during the operation of the conveyer the upper run functions as a feeder to deposit the material from said inlets onto the lower run in a loose and uncompacted condition irrespective of the pressure upon the material within the inlet, said lower run delivering all of said material to said outlet.

2. In a conveying apparatus, in combination, a conduit provided with a plurality of inlets and a single outlet, a hopper above each inlet for containing flowable solid material discharging into said inlet, a conveying unit of open formation having upper and lower runs positioned in said conduit, dividing plates each positioned below one of said inlets and within said conduit between the runs of the conveyer, each dividing plate extending in each direction beyond the angle of repose of the material in said inlet, the lower run of said conveyer constituting the carrying run, said lower run passing under each inlet, the upper run of the conveyer passing over said plates, said plates being spaced from each other to provide openings therebetween whereby during operation of the conveyer the upper run functions as a feeder to separately feed material from each inlet onto the lower run in a loose and uncompacted condition irrespective of the pressure upon the material within the inlet, and means for adjustably controlling the amount of material fed from each inlet, said lower run of said conveyer delivering all of said material to said outlet.

ARNOLD REDLER.